(12) United States Patent
Rice

(10) Patent No.: US 11,324,195 B2
(45) Date of Patent: May 10, 2022

(54) PET FEEDING DEVICE WITH AN INWARD LIP

(71) Applicant: Leonard Rice, Sun City, AZ (US)

(72) Inventor: Leonard Rice, Sun City, AZ (US)

(*) Notice: Subject to any disclaimer, the term of this patent is extended or adjusted under 35 U.S.C. 154(b) by 47 days.

(21) Appl. No.: 16/923,701

(22) Filed: Jul. 8, 2020

(65) Prior Publication Data

US 2022/0007613 A1  Jan. 13, 2022

(51) Int. Cl.
*A01K 5/01* (2006.01)
*A01K 7/00* (2006.01)

(52) U.S. Cl.
CPC ............ *A01K 5/0135* (2013.01); *A01K 7/005* (2013.01)

(58) Field of Classification Search
CPC .............................. A01K 5/0135; A01K 7/005
USPC ....................................................... 119/61.54
See application file for complete search history.

(56) References Cited

U.S. PATENT DOCUMENTS

| | | | |
|---|---|---|---|
| 2,928,372 A * | 3/1960 | Farley | A01K 5/0114 119/61.54 |
| 3,491,724 A * | 1/1970 | Sunner | A01K 5/0114 119/61.54 |
| 3,498,268 A | 3/1970 | Sleith | |
| 3,722,476 A * | 3/1973 | Van Ness | A01K 5/0114 119/61.54 |
| 3,734,062 A * | 5/1973 | O'Hara | A01K 5/0135 119/61.54 |
| 5,000,123 A | 3/1991 | Morse | |
| 5,105,768 A * | 4/1992 | Johnson | A01K 7/005 119/61.56 |
| 5,791,287 A * | 8/1998 | Gruber | A01K 7/005 119/61.54 |
| 5,975,016 A * | 11/1999 | Wesenhagen | A01K 5/0135 119/61.55 |
| 6,032,824 A * | 3/2000 | Barrow | A01K 5/0135 220/621 |
| 6,112,698 A | 9/2000 | Zelinger | |
| D446,362 S | 8/2001 | Choi | |
| D466,655 S | 12/2002 | Zelinger | |
| 8,544,412 B1 * | 10/2013 | Haverstock | A01K 5/0135 119/61.54 |
| 8,752,507 B2 | 6/2014 | Korrie | |
| 2003/0168016 A1 * | 9/2003 | Zolnierz | A01K 5/0135 119/61.54 |
| 2003/0230244 A1 * | 12/2003 | Morrison | A01K 7/005 119/61.54 |
| 2004/0231607 A1 | 11/2004 | Hollinger | |
| 2008/0022937 A1 * | 1/2008 | Shirley | A01K 7/005 119/72 |
| 2011/0041771 A1 * | 2/2011 | Rocker | A01K 5/0128 119/61.54 |
| 2013/0192529 A1 * | 8/2013 | Kruger | A01K 7/005 119/72 |
| 2014/0165920 A1 * | 6/2014 | Sarty | A01K 7/005 119/72 |
| 2017/0181400 A1 * | 6/2017 | Hoffman | A01K 7/005 |

* cited by examiner

*Primary Examiner* — Brady W Frazier
*Assistant Examiner* — Zoe Tam Tran

(57) ABSTRACT

A pet feeding device for deterring spillage during eating and drinking includes a bowl, which is positionable on a substantially horizontal surface and is at least partially filled with contents. A lip is engaged to a rim of the bowl and extends inwardly therefrom. The lip deters spillage of contents of the bowl during feeding and drinking therefrom by a pet.

15 Claims, 4 Drawing Sheets

PET FEEDING DEVICE WITH AN INWARD LIP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feeding devices and more particularly pertains to a new feeding device for deterring spillage during eating and drinking.

(2) Description of Related Art Including Information Disclosed Under 37 CFR 1.97 and 1.98

The prior art relates to feeding devices for pets. Prior art feeding devices to minimize or address spillage during feeding may include weighted bowls, mats, and devices, such as suction cups, for securing a bowl to a surface,

BRIEF SUMMARY OF THE INVENTION

An embodiment of the disclosure meets the needs presented above by generally comprising a bowl, which is configured to be positionable on a substantially horizontal surface and to be at least partially filled with contents, such as food and water. A lip is engaged to a rim of the bowl and extends inwardly therefrom. The lip is configured to deter spillage of contents of the bowl during feeding and drinking therefrom by a pet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
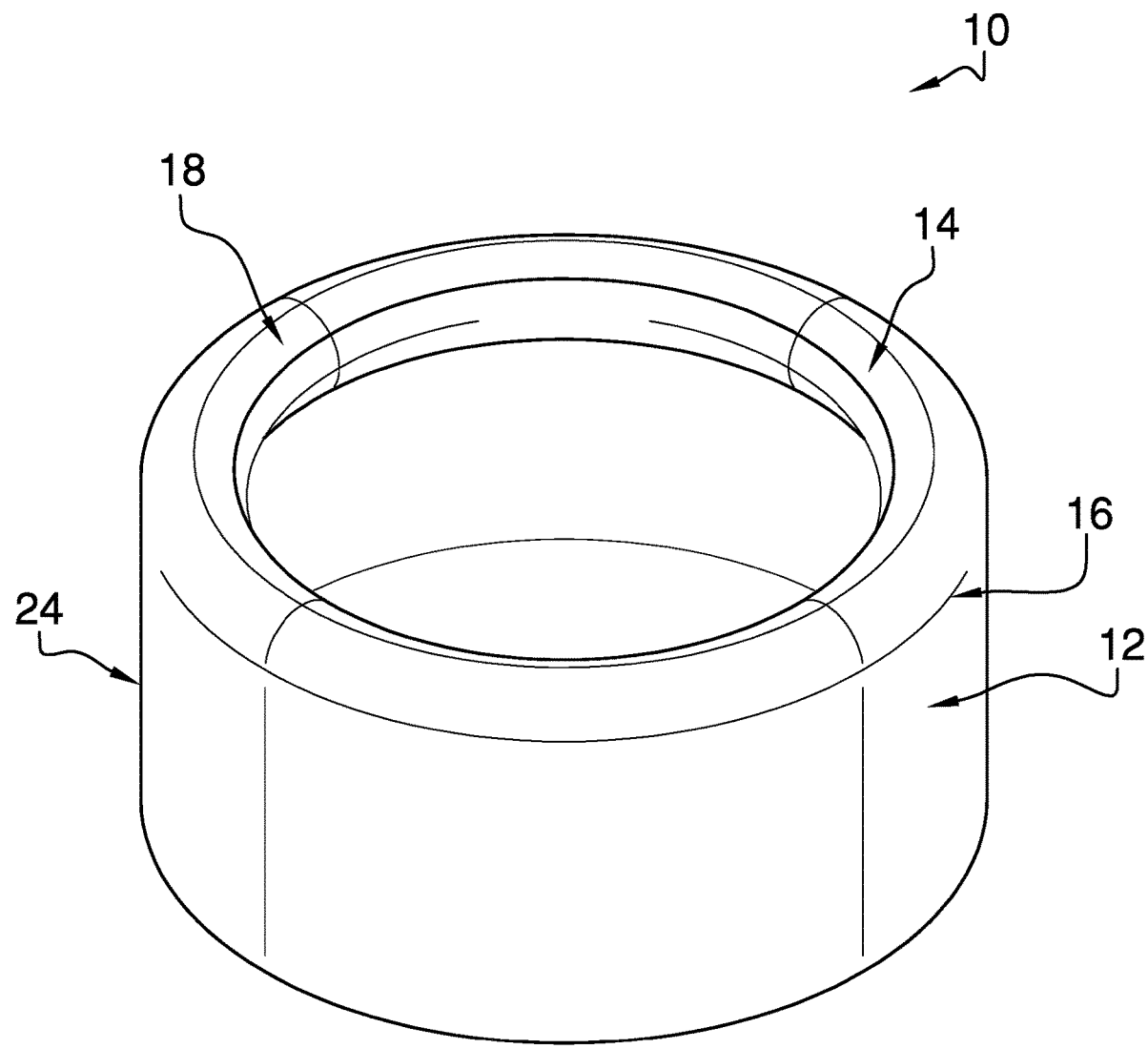
FIG. 1 is an isometric perspective view of a pet feeding device according to an embodiment of the disclosure.

With reference now to the drawings, and in particular to FIGS. 1 through 4 thereof, a new feeding device embodying the principles and concepts of an embodiment of the disclosure and generally designated by the reference numeral 10 will be described.

Figure 2:
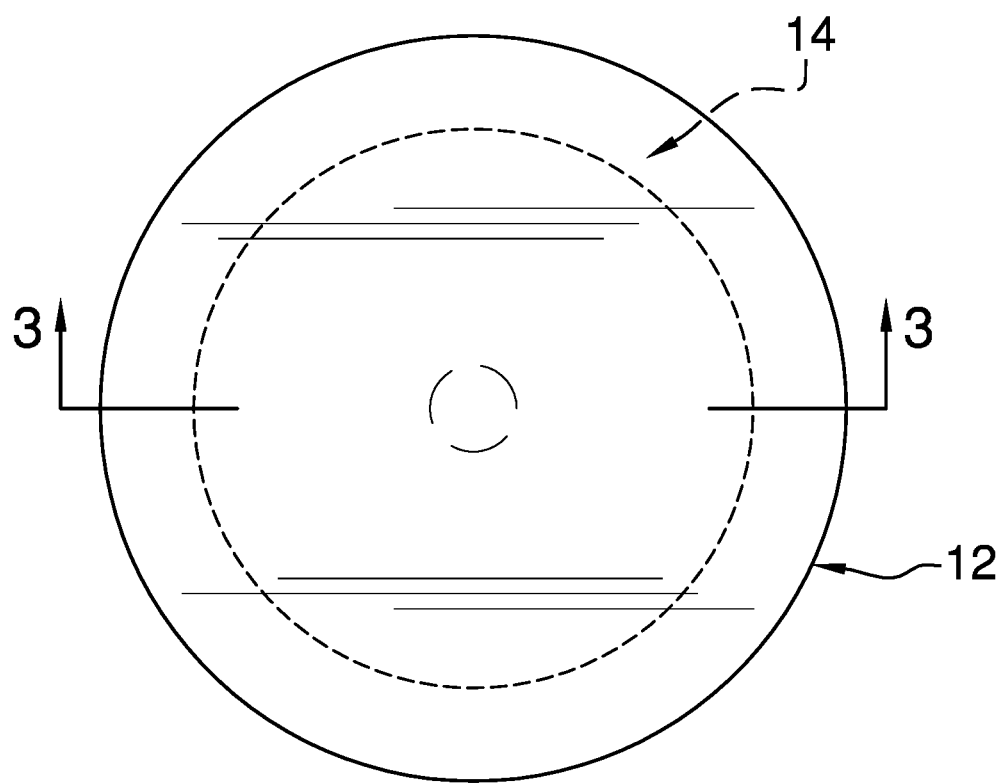
FIG. 2 is a bottom view of an embodiment of the disclosure.

As best illustrated in FIGS. 1 through 4, the pet feeding device 10 generally comprises a bowl 12, which is configured to be positionable on a substantially horizontal surface and to be at least partially filled with contents. The bowl 12 may be circularly shaped, as shown in FIG. 2, or alternatively shaped, such as, but not limited to, ovally shaped, rectangularly shaped, and the like.

A lip 14 is engaged to a rim 16 of the bowl 12 and extends inwardly therefrom. The lip 14 is configured to deter spillage of contents of the bowl 12 during feeding and drinking therefrom by a pet.

Figure 3:
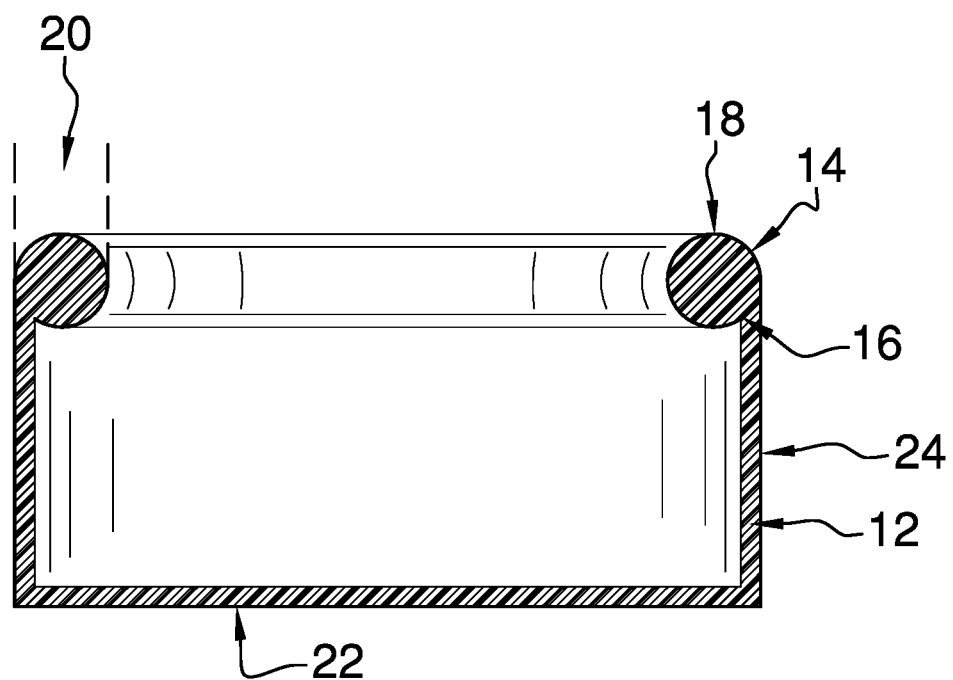
FIG. 3 is a cross-sectional view of an embodiment of the disclosure.
Figure 4:
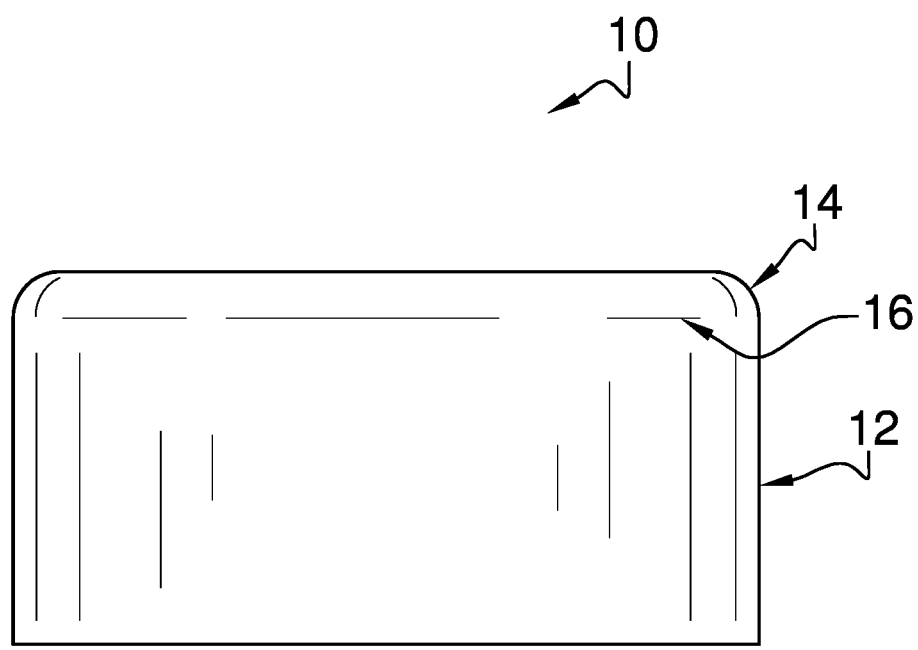
FIG. 4 is a side view of an embodiment of the disclosure.

The lip 14 extends arcuately from the rim 16 and may have a cross-sectional profile 18 that is substantially circular, as shown in FIG. 3. The present invention anticipates the cross-sectional profile 18 of the lip 14 being alternatively shaped, such as, but not limited to, ovally shaped, elliptically shaped, and the like.

The lip 14 has a diameter 20. The bowl 12 has a width 22 and a height 24. The height 24 is from four to eight times greater than the diameter 20. The width 22 is from eight to sixteen times greater than the diameter 20. The diameter 20 measures from 1.0 to 1.5 centimeters. The diameter 20 may measure 1.27 centimeters, as shown in FIG. 3.

The lip 14 may be solid, as shown in FIG. 3, or tubular (not shown). The lip 14 and the bowl 12 may comprise metal, such as stainless steel, or other substantially rigid material, such as, but not limited to, plastic, wood, and the like.

In use, the bowl 12 may be at least partially filled with water or food for a pet and then positioned on a substantially horizontal surface. As the pet drinks or feeds from the bowl 12, the lip 14 acts to deter spillage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A pet feeding device comprising:
a bowl configured to be positionable on a substantially horizontal surface and for being at least partially filling with contents; and
a lip engaged to a rim of the bowl and extending inwardly therefrom, wherein the lip is configured for deterring spillage of contents of the bowl during feeding and drinking therefrom by a pet, wherein the lip has an outer surface extending inwardly and arcuately from the rim, the outer surface of the lip extending full around and back to the bowl wherein the outer surface of the lip has a circular cross-sectional profile and a convex shape facing a bottom of the bowl.

2. The pet feeding device of claim 1, wherein the bowl is circularly shaped.

3. The pet feeding device of claim 1, wherein:
the lip has a diameter; and
the bowl has a height, the height being from four to eight times greater than the diameter.

4. The pet feeding device of claim 3, wherein the diameter measures from 1.0 to 1.5 centimeters.

5. The pet feeding device of claim 4, wherein the diameter measures 1.27 centimeters.

6. The pet feeding device of claim 1, wherein:
the lip has a diameter; and
the bowl has a width, the width being from eight to sixteen times greater than the diameter.

7. The pet feeding device of claim 6, wherein the diameter measures from 1.0 to 1.5 centimeters.

8. The pet feeding device of claim 7, wherein the diameter measures 1.27 centimeters.

9. The pet feeding device of claim 1, wherein:
the lip has a diameter; and
the bowl has a width and a height, the height being from four to eight times greater than the diameter, the width being from eight to sixteen times greater than the diameter.

10. The pet feeding device of claim 9, wherein the diameter measures from 1.0 to 1.5 centimeters.

11. The pet feeding device of claim 10, wherein the diameter measures 1.27 centimeters.

12. The pet feeding device of claim 1, wherein the lip is solid or tubular.

13. The pet feeding device of claim 1, wherein the lip and the bowl comprise metal.

14. The pet feeding device of claim 13, wherein the lip and the bowl comprise stainless steel.

15. A pet feeding device comprising:
a bowl configured to be positionable on a substantially horizontal surface and for being at least partially filling with contents, the bowl being circularly shaped; and
a lip engaged to a rim of the bowl and extending inwardly therefrom, wherein the lip is configured for deterring spillage of contents of the bowl during feeding and drinking therefrom by a pet, wherein the lip has an outer surface extending inwardly and arcuately from the rim, the outer surface of the lip extending fully around and back to the bowl wherein the outer surface of the lip has a circular cross-sectional profile and a convex shape facing a bottom of the bowl, the lip having a diameter, the bowl having a width and a height, the height being from four to eight times greater than the diameter, the width being from eight to sixteen times greater than the diameter, the diameter measuring from 1.0 to 1.5 centimeters, the diameter measuring 1.27 centimeters, the lip being solid or tubular, the lip and the bowl comprising metal, the lip and the bowl comprising stainless steel.

* * * * *